United States Patent [19]

Kojima et al.

[11] Patent Number: 5,200,368
[45] Date of Patent: Apr. 6, 1993

[54] CONTINUOUS SOLDER COATING APPARATUS AND ITS METHOD

[75] Inventors: Naokatsu Kojima, Sunto; Shinichi Makino, Mishima, both of Japan

[73] Assignee: Kabushiki-Kaisha Fuji Seiki Seizo Sho (Fuji Seiki Machine Works, Co. Ltd.), Shizuoka, Japan

[21] Appl. No.: 764,730

[22] Filed: Sep. 24, 1991

[30] Foreign Application Priority Data

Sep. 25, 1990 [JP] Japan .................................. 2-251989

[51] Int. Cl.⁵ .............................................. H01L 21/60
[52] U.S. Cl. ................................... 437/220; 437/217; 437/225; 228/179; 228/180.1
[58] Field of Search ................ 437/225, 217, 220; 228/178, 179, 180.1; 219/129, 85.1, 85.2, 85.3

[56] References Cited

U.S. PATENT DOCUMENTS

| | | | |
|---|---|---|---|
| 4,807,794 | 2/1989 | Hess | 228/180.1 |
| 4,885,837 | 12/1989 | Eshima et al. | 437/220 |
| 4,920,074 | 4/1990 | Shimizu et al. | 437/217 |
| 4,987,100 | 1/1991 | McBride et al. | 437/220 |
| 5,011,067 | 4/1991 | Foisy | 228/179 |
| 5,031,821 | 7/1991 | Kaneda et al. | 228/179 |
| 5,034,349 | 7/1991 | Landis | 437/220 |

*Primary Examiner*—Brian E. Hearn
*Assistant Examiner*—Kevin M. Picardat
*Attorney, Agent, or Firm*—Flynn, Thiel, Boutell & Tanis

[57] ABSTRACT

A lead frame having thereon a plurality of semiconductor devices is prepared by immersing it in a flux solution to activate the lead frame surface and to remove oxide film. The lead frame is then transferred to a coating block unit, and the lead frame is moved along a lateral passage which extend through the coating block unit. During movement through the passage, the lead sections of the lead frame are coated on both upper and lower surfaces thereof with liquid solder which ascends by capillary action along a slit which projects upwardly from a liquid solder bath and communicates with the passage. The solder in the slit, where it communicates with the passage, is continually replenish by capillary action from the bath as the solder coats the lead sections as the lead frame moves through the passage.

17 Claims, 9 Drawing Sheets

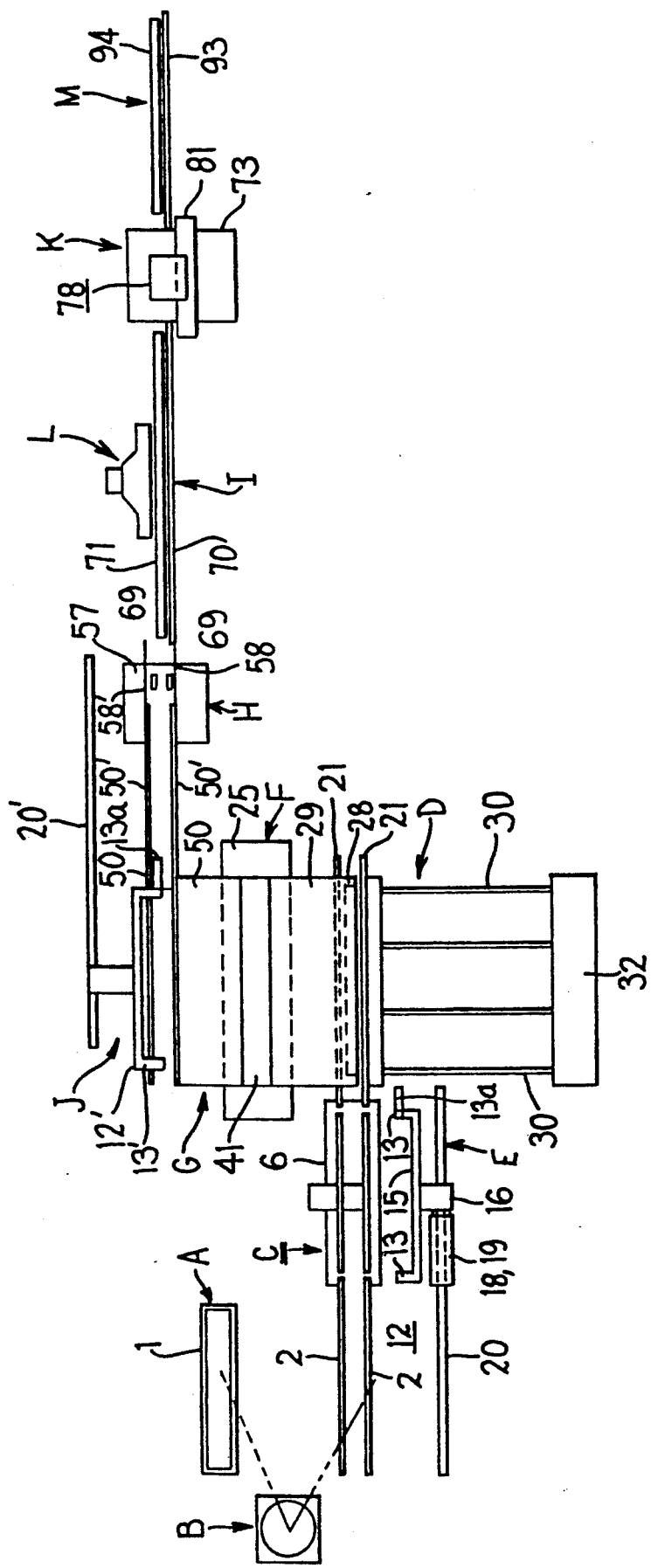

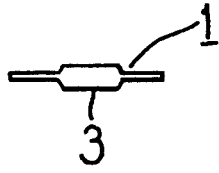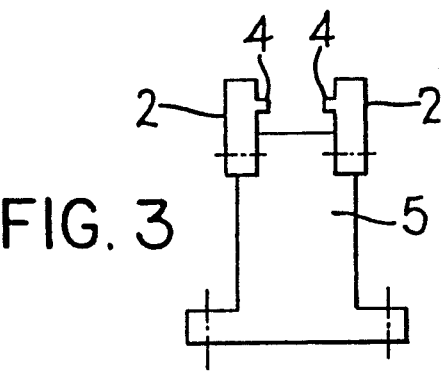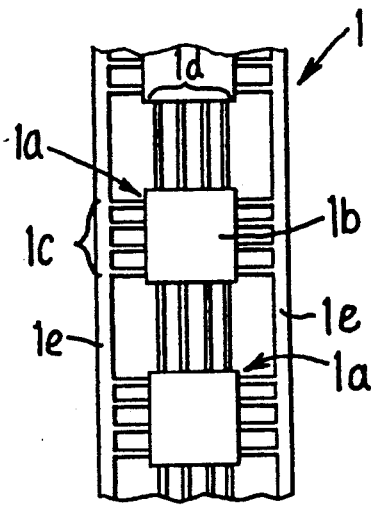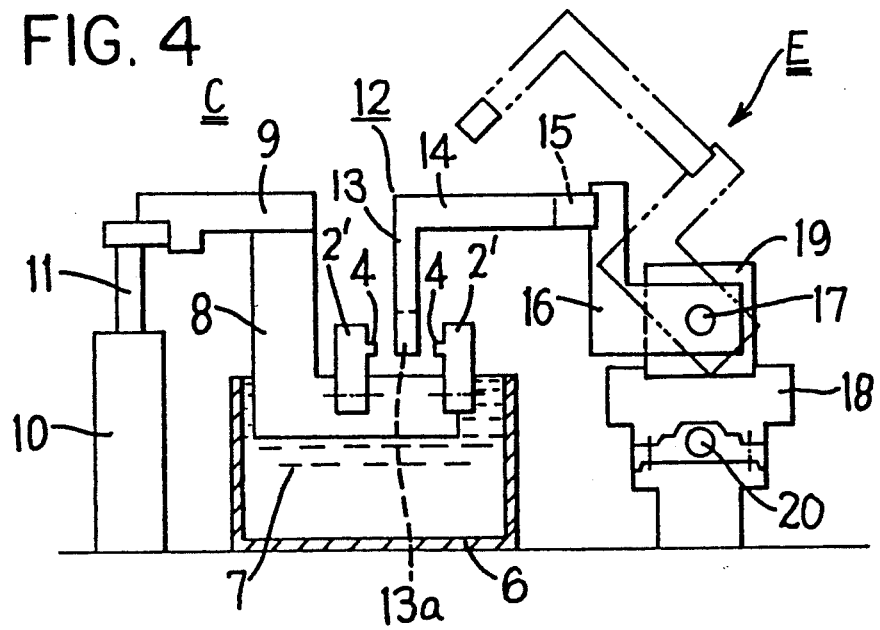

CONTINUOUS SOLDER COATING APPARATUS AND ITS METHOD

FIELD OF THE INVENTION

This invention relates to an improved continuous solder-coating apparatus which relies upon capillary action for feeding solder to the coating area, and which is particularly desirable for coating the leads of semiconductor devices packaged on a lead frame.

BACKGROUND OF THE INVENTION

There currently are two basic methods which are conventionally utilized for coating the leads of semiconductor devices packaged on a lead frame with a soft material, such as a solder material. These two methods involve a solder plating method and a solder immersing (i.e. dipping) method.

In the immersion method, there is no need for complementary electric equipment. Rather, the metal part to be plated is coated by simply immersing the part or workpiece in the solder material. This method is advantageous due to its simplicity. However, in the case of solder coating of lead frames, there is a significant problem, namely how to eliminate the thermalshock imposed on the electronic device inside the plastic package when the device mounted on the lead frame is immersed in the bath of hot metal.

Accordingly, when it is desired to solder coat the leads of semiconductor devices using the immersion method, the semiconductor package is separated from the lead frame so that each package is then individually handled and is dipped into the solder bath in such a way that only the lead section is immersed and coated. However, since each semiconductor device normally has a plurality of lead sections projecting not only from a first pair of opposite sides of the plastic package, but also from a second pair of opposite sides of the package, this hence requires that each package be individually handled and controlled so as to permit immersion of solely a single lead section, followed by manipulation of the package to permit immersion of a further lead section. This hence requires significant manipulation of the package, followed by immersion several times, depending upon the number of lead sections provided on the package. While this procedure avoids immersion of the plastic package into the hot solder bath so as to avoid the thermalshock problem, nevertheless the procedure is obviously complex and time consuming in view of the multiple handling steps required, and the requirement that such steps be accomplished with respect to each single package.

The dipping or immersion method is hence inefficient and unsatisfactory for use with semiconductor devices which mount on lead frames and which have lead sections projecting outwardly from two or more sides of the plastic package.

As an alternative method, the Assignee of the present invention has developed a solder coating apparatus which uses a pair of coating rolls between which the lead frame is fed before the semiconductor packages are cut from the lead frame. With this apparatus, the rolls dip into a solder bath so as to pick up a coating of solder thereon, and then transfer the solder to the leads associated with the lead frame as the lead frame moves through the nip between the coating rolls. This apparatus permits automatic and substantially continuous coating of the leads associated with the lead frame.

In the aforementioned roll coating apparatus, if the packages mounted on the lead frame have lead sections projecting outwardly only from opposite sides which extend transversely relative to the elongated direction of the lead frame, then the leads associated with the plurality of packages on the lead frame can be coated by a single pass between the rolls. However, when the packages are of the type having leads sections which project from transversely oriented sides of the plastic package, then such lead frames must be passed through two types of roll coating devices, with one such device involving multiple aligned pairs of rolls so as to permit the lead frame to pass therebetween in a direction perpendicular to its elongated direction. While this prior apparatus has advantageous operating features in that it permits the lead sections of multiple packages to be coated while still attached to the lead frame, nevertheless such apparatus still does not possess the desired simplicity.

Accordingly, it is an object of this invention to provide an improved apparatus and method for solder coating, particularly for solder coating of multiple lead sections associated with semiconductor devices which are united to a common lead frame. This apparatus permits more efficient handling of the lead frames and coating of the lead sections.

According to the present invention, a lead frame having thereon a plurality of semiconductor devices is prepared by immersing it in a flux solution to activate the lead frame surface and to remove oxide film. The lead frame is then transferred to a coating block unit, and the lead frame is moved along a lateral passage which extend through the coating block unit. During movement through the passage, the lead sections of the lead frame are coated on both the upper and lower surfaces thereof with liquid solder material which ascends by capillary action along a slit which projects upwardly from a liquid solder bath and communicates with the passage. The solder in the slit, where it communicates with the passage, is continually replenish by capillary action from the bath as the solder coats the lead sections associated with the lead frame as the lead frame moves through the passage. The liquid solder bath has an inert gas discharge pipe therein. The feed slit for the solder is of microwidth, preferably in the range of between 0.1 and 0.5 mm, to facilitate the feeding of solder upwardly through the slit by capillary action.

Described in greater detail, the continuous solder coating apparatus of this invention includes: a flux containment device defining a flux bath in which the lead frame is immersed; a liquid solder bath which has an inert gas discharge pipe therein; a solder coating block having its lower end immersed in the solder bath and having a number of capillary slits feeding upwardly from the bath to a lead frame transfer passage, which slits correspond in number to the number of lead sections which project in the lengthwise direction of the lead frame; a lateral feeding device which feeds the lead frame laterally (i.e., sidewardly) through the aforementioned coating block so that all of the lead sections which project longitudinally of the lead frame are simultaneously coated on both upper and lower surfaces thereof due to the upward capillary feed of solder through the slits; a flux coating device which applies a flux solution on both the upper and lower surfaces of the laterally projecting lead sections by two pairs of brush wheels, which lower wheels are immersed in the flux bath; a second liquid solder coating bath having an inert gas discharge pipe therein; and a second solder coating block which has a lower end immersed in the second bath and which is provided with a guide passage for permitting longitudinal movement of the lead frame therethrough, which latter block has two capillary slits which project upwardly from the bath and communicate with the passage adjacent opposite sides for coating the lateral lead sections as the lead frame moves longitudinally through the passage.

In the solder coating block of the present invention, there is provided opposed coating and guide bodies which cooperate to define the passage through which the lead frame passes, which passage is formed by grooves in the upper and lower coating body. The lower coating body also includes a groove to receive and to dispose of surplus liquid solder.

By providing the solder bath with an inert gas discharge therein, this is effective for preventing oxidation of the solder in the bath. Further, the inert gas becomes entrained in the solder, and ascends with the liquid solder which ascends upwardly through the slit by capillary action, so as to prevent oxidation.

With the solder coating apparatus of the present invention, both upper and lower surfaces of the lead sections can be efficiently and uniformly coated with solder simultaneously, while feeding solder solely upwardly by capillary action through small feed slits. This permits controlled coating of both sides of the lead sections so as to provide for desired and uniform coating thicknesses while preventing the build up or bridging of solder between the individual leads of the lead section. This also prevents the application of hot solder to the plastic package. This permits a plurality of semiconductor devices as mounted on a single lead frame to be continuously and simultaneously processed. Further, when the semiconductor device involves a conventional square plastic package having lead sections projecting outwardly from all four sides thereof, the lead sections can be conveniently and efficiently coated by effecting coating in sequential steps, with one step involving movement of the lead frame in a lateral direction through a coating block, and the other step involving movement of the lead frame in a longitudinal direction through a coating block.

Other objects and purposes of the invention will be apparent to persons familiar with methods and apparatus of this general type upon reading the following specification and inspecting the accompanying drawings.

BRIEF DESCRIPTION OF THE DRAWINGS

FIG. 1 is a diagrammatic plan view illustrating the general layout of an apparatus embodying the invention.

FIG. 2A is a fragmentary plan view of a conventional lead frame showing a plurality of semiconductor devices mounted in longitudinally spaced relationship along the lead frame, and FIG. 2B is a cross sectional view through the lead frame of FIG. 2A.

FIG. 3 is a fragmentary side view showing the guideway for the lead frame.

FIG. 4 is a elevational view which illustrates the flux coating device and the lead frame transfer device.

Figure 5:
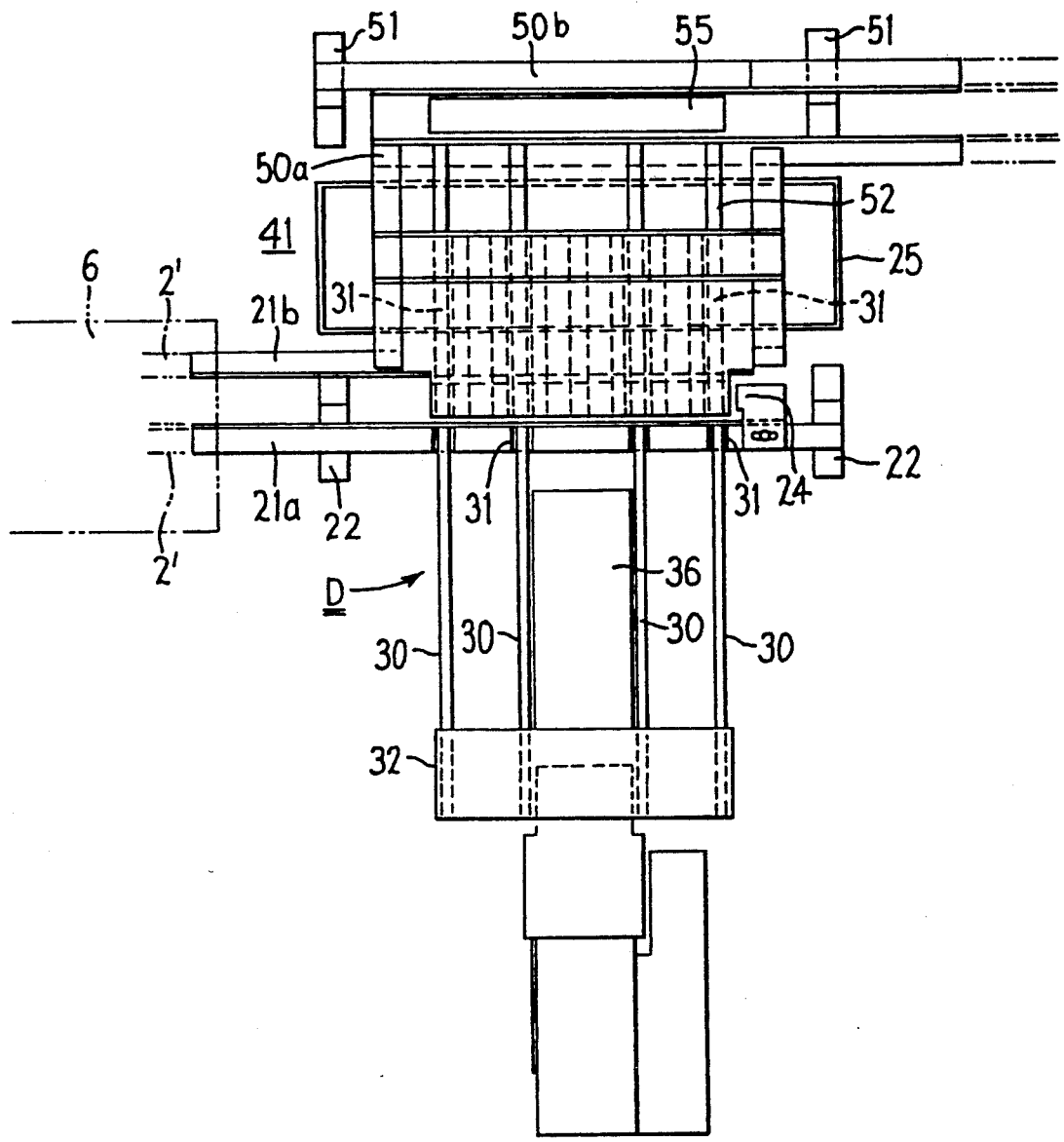
FIG. 5 is a plan view which illustrates the locating and transfer device, the lateral solder coating device, and the locating device.

Certain terminology will be used in the following description for convenience in reference only, and will not be limiting. For example, the words "upwardly", "downwardly", "rightwardly" and "leftwardly" will refer to directions in the drawings to which reference is made. The word "forward" will refer to the normal direction of movement of the lead frame through the coating apparatus. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

A brief description of the overall solder coating apparatus of the invention will be briefly described with reference to FIG. 1. There is illustrated therein a conventional storage cassette A in which a plurality of lead frames 1 are vertically stacked. The lead frames are individually removed from cassette A by a transfer device B which in turn positions the lead frame on a guide assembly which includes a pair of generally parallel guideways 2. A flux coating device C is aligned with the guideways 2 for cleaning and coating the lead frame, from which the lead frame is then supplied to a locating and transfer device D. A lead-frame transfer device E is provided for effecting movement of the lead frame along guideways 2 to the flux coating device C, and for effecting further transfer of the lead frame to the locating device D. A lateral solder coating device F is disposed adjacent the locating and transfer device D, and projects perpendicularly relative to the longitudinal or elongated direction of the lead frame, whereby the transfer device D is effective for moving the elongate lead frame laterally through the solder coating device F to effect coating of the longitudinally-oriented lead sections. The lead frame is moved from the lateral solder coating device F onto a further locating device G which is positioned downstream of the lateral solder coating device. This lead frame locating device G positions the lead frame for movement in the elongated direction thereof, and is aligned with a further flux coating device H, and it in turn aligns with a further lead frame locating structure I which permits forward movement of the lead frame in the longitudinal direction thereof. A lead frame transfer device J is provided for moving the lead frame longitudinally from the locating device G to the flux coating device H. A longitudinal solder coating device K is located adjacent the locating device I so that the lead frame can be moved longitudinally through the coating device K to effect solder coating of the lead sections which project transversely (i.e., laterally) of the lead frame. A transfer device L is provided for moving the lead frames longitudinally from the locating device I and through the longitudinal solder coating device K for discharge of the lead frame to a terminal station M.

The overall structure and operation of the solder coating arrangement, as summarized above, will now be described in greater detail.

Considering first a typical lead frame, reference is made to FIGS. 2A and 2B which illustrate a conventional lead frame 1 which includes a plurality of semiconductor units 1a which are secured to the lead frame in longitudinally spaced relationship therealong. Each unit 1a includes a blocklike plastic package 1b which encloses the semiconductor device and is provided with lead sections, each normally comprising a plurality of individual metal leads, projecting outwardly from one or more sides of the plastic package. In the illustrated embodiment each plastic package 1b has lead sections 1c projecting outwardly from opposite sides of the package in the lateral or transverse direction of the lead frame, and also has lead sections 1d projecting outwardly from opposite sides of the plastic package in the longitudinal or elongated direction of the lead frame. The lead sections 1c conventionally connect to opposite edge strips 1e which extend lengthwise of the lead frame. These edge strips and the lead sections are all joined together and are initially stamped from a thin metal strip.

The lead frame transfer device B may assume many configurations, such devices already being known, and hence such device is not illustrated in detail. However, such device may comprise a horizontally swingable transfer arm (indicated by dotted lines in FIG. 1) having a chuck arrangement, such as vacuum chuck, on the free end for engaging the lead frame. Such arm can be lowered to engage the topmost lead frame in the cassette, then raised to lift the cassette, thereafter swung so as to position the cassette over the guideways 2, and then lowered to deposit the lead frame on the guideways 2.

The guideway arrangement for receiving the individual lead frame 1 includes a pair of generally horizontally elongate guideways 2 disposed in sidewardly spaced but parallel relationship. These guideways 2 define thereon, as indicated by FIG. 3, a pair of opposed steps or rails 4 which are horizontally elongated but sidewardly spaced apart, whereby the longitudinally elongated lead frame can be positioned between the guideways 2 so that the opposite edge strips 1e are slidably positioned on upper surfaces of the guide rails 4. The spacing between the guide rails enables the plastic packages 1b to project downwardly therebetween. The guide rails are stationarily secured by a suitable frame or support 5.

The flux coating device C is disposed directly adjacent the downstream end of the guideways 2 and, as illustrated by FIGS. 1 and 4, includes a pair of generally parallel supporting bars 2' which also have support rails 4 thereon. These supporting bars 2', when in an upper position as illustrated by FIG. 4, are directly aligned with the discharge end of the guideways 2. These support bars 2', when in the illustrated upper position, are disposed adjacent an upwardly opening tank or reservoir 6 which contains therein a bath of flux solution 7.

Support bars 2' are secured to the lower leg of an L-shaped support member 8 which has a vertical leg which projects upwardly and is fixedly secured to a bridge member 9, the latter being secured to the vertically-movable piston rod 11 of a conventional fluid pressure cylinder 10. When cylinder 10 is contracted from the position illustrated in FIG. 4, then the support bars 2' and the lead frame supported thereon are lowered downwardly to permit the lead frame 1 to be dipped into the flux bath 7 for coating by the flux solution. After such coating, the cylinder 10 is again extended to move the support bars 2' upwardly out of the flux bath back to their original uppermost position wherein they are aligned with the guideways 2.

The lead frame 1 is slidably transferred from guideways 2 onto support bars 2' by the transfer device E. This device E, as illustrated by FIGS. 1 and 4, includes a U-shaped or forklike lead frame holder 12 which is defined by a connecting bar 15 which extends generally parallel with the support bar 2' and has a pair of holding arms 14 projecting outwardly from opposite ends thereof, which arms 14 have sticklike engaging elements 13 fixed to and projecting downwardly from ends thereof. These elements 13 are spaced apart by a distance which substantially corresponds to the length of the lead frame so that the members 13 can straddle the lead frame in the lengthwise direction thereof. The connecting bar 15 is secured to one end of a vertically swingable actuating arm 16, the latter being mounted on a generally horizontal pivot 17 to a cradle 19 which is fixedly secured to a slider 18. This slider 18 is slidable along a horizontal guide rod 20 which extends generally parallel with the guideway 2 and support bar 2'. The sliding block 18 is slidably movable by a conventional linear actuator, such as a rodless pressure cylinder. The swingable actuator arm 16 can also be swingably moved between raised and lowered positions by a conventional actuator, such as a fluid pressure cylinder.

When the slide 18 is in a retracted position (a leftward position in FIG. 1) adjacent the guideways 2, then the holder 12 is swung downwardly to straddle the lead frame positioned on the guideways 2, following which slide block 18 is advanced forwardly (rightwardly in FIG. 1) to slide the lead frame onto support bars 2'. The holder 12 is then swung upwardly to its raised position, and the slide block 18 returned leftwardly in FIG. 1 to its starting position for engagement with the next lead frame. During this time, the lead frame positioned on the support bars 2' is immersed in the solder bath.

Figure 6:
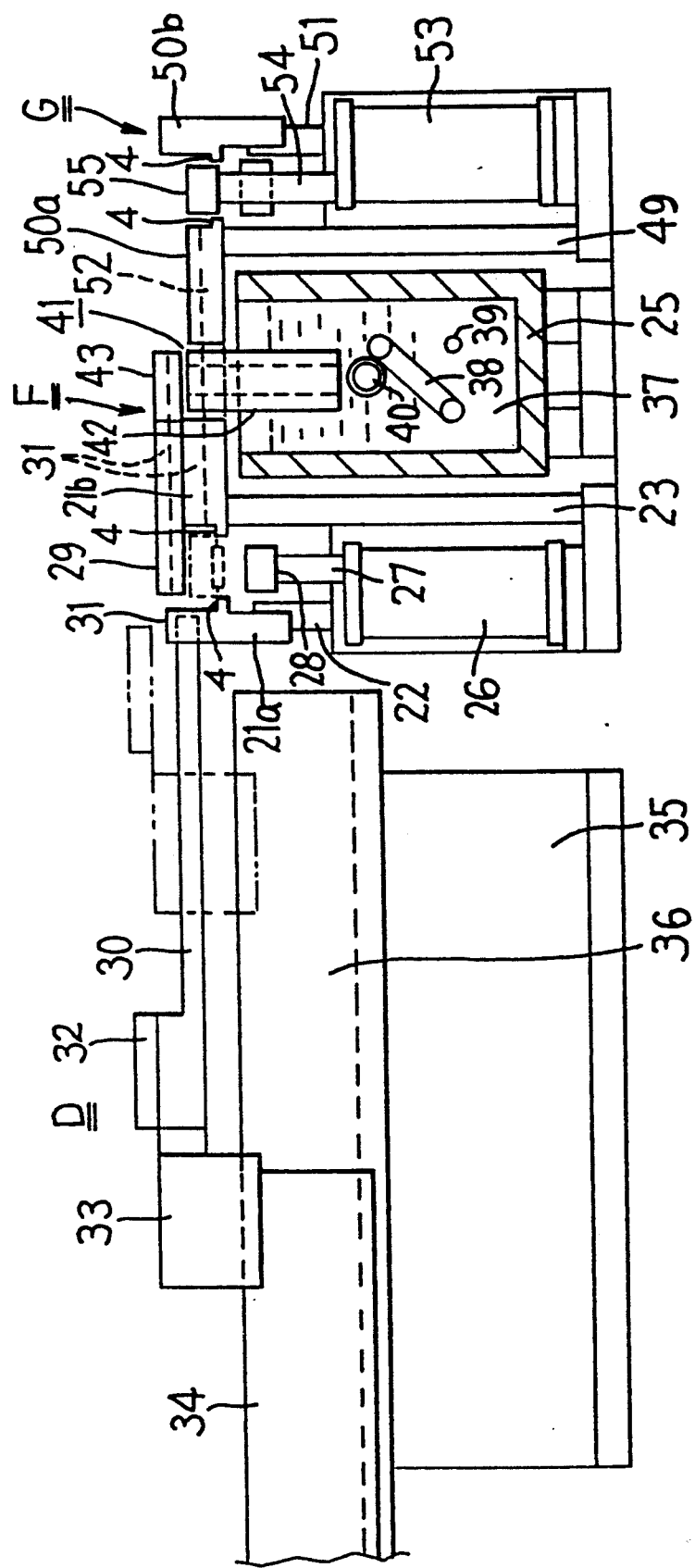
FIG. 6 is a side view of FIG. 5, with parts thereof omitted for purposes of illustration.

The frontmost stick 13 of the holder 12 is provided with a push rod or extension 13a on the lower free end thereof, which push rod 13a projects forwardly support bar 2'. When the holder 12 engages the next lead frame positioned on the guideways 2 and moves this lead frame forwardly, the push rod 13a engages the forwardly adjacent lead frame as positioned on the support bars 2' and slidably displaces this forward lead frame out of the flux coating device C and into the locating and transfer device D. The locating and transfer device D, as illustrated by FIGS. 5 and 6, includes a pair of horizontally elongate and generally parallel guideways 21a and 21b which project forwardly from and effectively constitute extensions of the support bars 2' for maintaining longitudinally-oriented support of the lead frame as it moves longitudinally forwardly from the flux coating device C. These guideways 21a and 21b are disposed at an elevation above the flux bath. Guideway 21a is supported by supports 22, whereas guideway 21b is supported by pillars 23. An adjustable stop 24 is provided at the forward end of guideway 21a for contacting the forward end of the lead frame to determine proper positioning thereof.

The guideways 21a and 21b are positioned adjacent but at an elevation above a tank or reservoir 25 which defines therein a bath of solder material. The guideway 21a is spaced sidewardly of the solder bath 25, whereas the guideway 21b extends generally across the top of the solder bath 25 adjacent one side thereof.

The locating and transfer device D also includes a top guide member or plate 29 which is mounted above the guideway 21b and, as illustrated by FIG. 6, projects outwardly from member 21b so as to generally overlap the space between guideways 21a and 21b. A pressure cylinder 26 is positioned below the guideways 21a, 21b and has an upwardly projecting piston rod 27 provided with a push pad 28 on the upper end thereof. This pad 28 is adapted to be moved upwardly by cylinder 26 so as to engage the lead frame which is supported on the rails 4 of guideways 21a, 21b, and then lift the lead frame upwardly from the rails into engagement with the undersurface of the top guide plate 29.

The undersurface of guide plate 29 and the top surface of guideway 21b are provided with opposed grooves which cooperate to define a channel or passage which extends horizontally across the top of the solder bath in a direction generally perpendicular with respect to the elongate direction of the guideways 21a, 21b. This passage has a cross section which substantially corresponds to the longitudinal cross section of the lead frame so as to permit the lead frame to be slidably guidably moved through this passage in the lateral (i.e. sideward) direction of the lead frame.

The lead frame is moved through the passage between guideway 21b and guide plate 29 by a plurality of push rods 30 which have the free ends positioned to engage a longitudinal edge of the lead frame. These push rods 30 have outer ends fixed to a cross plate 32 which is joined to a coupler 33 associated with a linear driving device 34, such as a pressure cylinder. The push rods 30 project through guide openings 31 formed in an upper portion of the guideway 21a for engaging the longitudinal edge of the lead frame when the lead frame has been raised up by the pad 28 so as to be positioned under the overhang portion of the top guide plate 29. The push rods 30 are also accommodated by guide openings 31' which extend through the overlapped plate 29 and guideway 21b. The push rods 30 not only moves the lead frame laterally through the guide passage defined between plate 29 and guideway 21b, but also move the lead frame laterally through the lateral solder coating device F so as to effect lateral movement of the lead frame onto the locating device G.

Considering now the lateral solder coating device F, and referring specifically to FIGS. 5 and 6, it includes the aforementioned tank or reservoir 25 which opens upwardly and contains a bath of molten solder therein. The solder bath 25 is equipped with a heating tube 38 and a temperature sensor 39 for controlling temperature of the solder. An inert gas delivery tube 40 opens interiorly of the solder bath to effect controlled circulation and bubbling of the bath, and to assist in causing the solder to ascend by capillary action upwardly through feed slits, as explained below.

A solder coating unit 41 is disposed so that a lower portion thereof projects downwardly and is immersed in the solder bath 25. This unit 41 is of a two-part construction and includes a lower coating block 42 which has the bottom portion thereof immersed in the solder bath, and an upper portion thereof disposed directly adjacent the discharge end of the guideway 21b. The unit 41 also includes a top guide block 43 which is disposed directly above the upper end of the coating block 42 and is positioned aligned with and directly adjacent the discharge end of the top guide plate 29.

Figure 7:
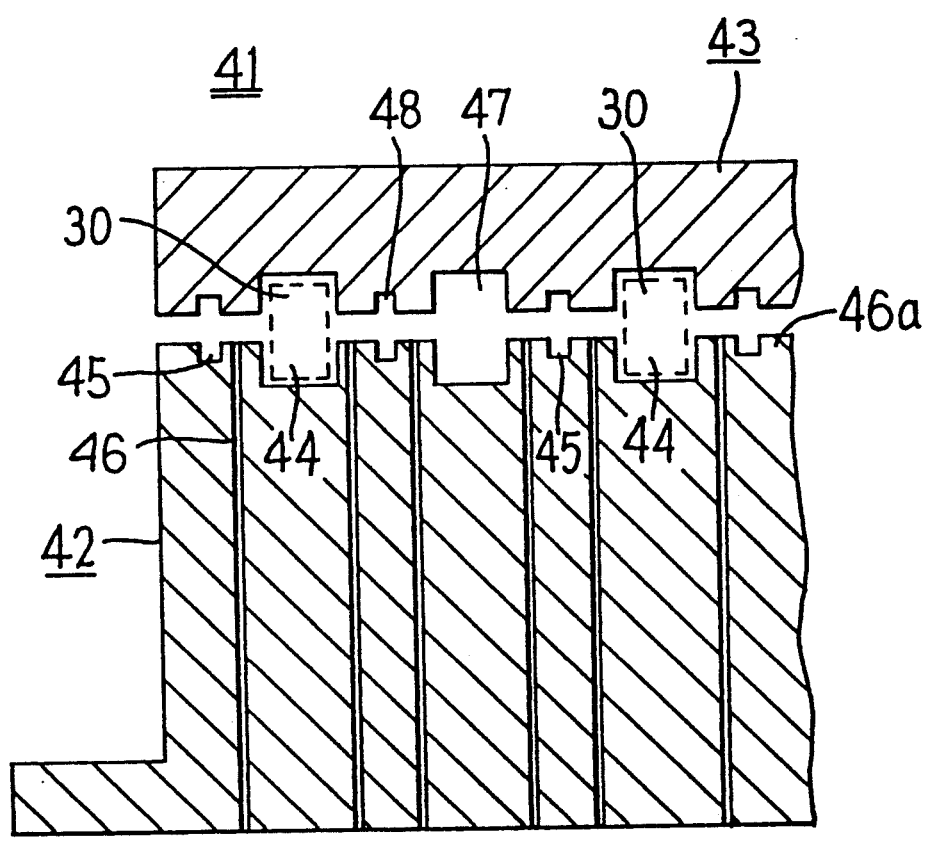
FIG. 7 is an enlarged, fragmentary sectional view of the coating block associated with the lateral solder coating device of FIG. 5.

The opposed surfaces of the coating and guide blocks 42 and 43 define therebetween a passage which in cross section corresponds to the longitudinal cross section of the lead frame for permitting the lead frame to be moved laterally thereof through the passage to permit coating of lead sections 1d. More specifically, as shown in FIG. 7, the passage defined between block 42 and 43 includes a plurality of generally parallel channel-like grooves 44 formed on the upper surface of the coating block 42. Each groove 44 has a cross section which substantially equals but is preferably slightly larger than the cross sectional configuration and area of the lower half of the plastic package 1b on the lead frame. Accordingly, the lower half of the plastic package 1b can pass through and along the groove 44, and the number of grooves 44 and their sideward spacing corresponds with the number and spacing of the plastic packages on the lead frame. A channel 45 of smaller cross section is formed in the upper surface of block 42 between each pair of grooves 44, with one channel 45 also being provided along the outer side of each outermost groove 44, whereby a pair of channels 45 are disposed so as to be on opposite sides on each groove 44. These channels 45 extend generally parallel with the grooves 44 and are spaced sidewardly therefrom so that there are defined protrusions or ribs 46a between each groove 44 and an adjacent channel 46, which ribs 46a have generally flat surfaces defined by the upper surface of the block 42.

The coating block 42 also has a plurality of narrow solder-supply slits 46 formed vertically therethrough. Each slit 46 at its upper end opens through the upper surface of one of the ribs 46a substantially midway between the adjacent groove 44 and channel 46, with the feed slit 46 also opening downwardly through the bottom of the block 42 for direct communication with the solder bath. The feed slit (or slot) 46 has a cross sectional depth (as extending in a direction parallel with channel 44 and hence parallel with the movement of the lead frame) which is of significant magnitude, as indicated by dotted lines in FIG. 6. However, the cross sectional width of the feed slit 46, as illustrated by FIG. 7, is very small so as to permit liquid solder material to ascend upwardly from the bath through the narrow slit 46 by capillary action. This ascending liquid solder is accompanied by inert gas bubbles from the bath. The capillary slit 46 preferably has a width (as measured perpendicular to the direction of lead frame movement) in the range from about 0.1 to about 0.5 mm.

The channels 45 are provided for collecting surplus solder material which flows out of the passage or channel between the upper and lower blocks during the coating process.

The groove 44, which provides for passage of the plastic package, has a depth which is preferably greater than the depth of the lower half of the plastic package so as to prevent surplus liquid solder, if it happens to fall into the groove 44, from adhering to the surface of the plastic package. The depth of groove 44 is selected so that the bottom surface of groove 44 is spaced downwardly from the bottom surface of the plastic package to provide a clearance therebetween of at least, and preferably more than, 0.5 mm.

The top or guide block 43 has a configuration on the lower side thereof which substantially corresponds with the configuration on the upper side of the coating block 42. That is, it includes grooves 47 which are aligned with and substantially corresponds with grooves 44 so as to accommodate the upper half of the plastic packages. Intermediate smaller channels 48 are also provided substantially directly over the lower channels 45 so as to accommodate surplus liquid solder.

The passage of channel defined between blocks 42 and 43 for accommodating and permitting lateral movement of the lead frame has been dimensionally exaggerated in FIG. 7 for purposes of explanation. However, the sectional dimensions of the passage between the blocks 42 and 43 are selected so as to provide minimal clearance between the metal surfaces of the lead frame (that is, the surfaces of the lead sections) and the opposing surfaces on the bodies 42 and 43. The clearance between each surface of the lead frame and the opposed surface of body 42 or 43 is desirably in the range of about 0.1 to about 0.5 mm, and preferably about 0.3 mm. With such dimensional clearances between the lead frame surfaces and the opposed coating block surfaces, liquid solder material in sufficient volume can be supplied by capillary action upwardly through the capillary slits 46 so as to properly and reliably coat not only the bottom surfaces of the lead sections 1d but also the upper surfaces thereof. This coating occurs as the lead frame is moved laterally through the passage defined between blocks 42 and 43 by the forward extending movement of the push rods 30.

The lead frame locating device G is provided for receiving thereon the lead frame as it is pushed laterally through and discharged from the lateral coating device F by the push rods 30. As shown by FIGS. 5 and 6, this locating device G includes a first guideway 50 supported by a pair of end pillars 49. A second guideway 50b is supported adjacent the end of guideway 50a by appropriate supporting elements 51. The guideway 50a is, as illustrated by FIG. 6, aligned directly adjacent the discharge end of the coating block 42 and defines thereon an upper guide surface which slidably supports the lead frame as it is discharged from the passage between block 42 and 43. This upper surface of guideway 50a also has grooves 52 formed therein for accommodating the push rod 30. The upper surface also has grooves or channels thereacross for accommodating the bottom half of the plastic packages on the lead frame.

The second guideway 50b is positioned adjacent the discharge end of guideway 50a and is elongated in a horizontal direction which extends perpendicularly to the lateral movement of the lead frame across the guideway 50a, whereby guideway 50b is elongated in the longitudinal direction of the lead frame. This guideway 50b is spaced from the discharge end of guideway 50a by a gap having a width which substantially corresponds to but slightly exceeds the transverse width of the lead frame. A fluid pressure cylinder 53 is positioned below this gap and has an upwardly extendable piston rod 54 provided with a horizontally elongate support plate 55 on the upper end thereof, which support plate 55 projects into the gap between the discharge end of guideway 50a and the opposed guideway 50b. Support plate 55 is normally disposed in the raised position illustrated in FIG. 6, in which position the upper surface of support plate 55 is generally aligned with the upper guide surface of guideway 50a. The upper surface of support plate 55 is also normally provided with channels thereacross for accommodating the plastic packages.

The lead frame is laterally slidably moved across the guideway 50 onto the upper surface of support plate 55 until the side edge of the lead frame substantially abuts the opposed guideway 50b. Cylinder 53 is then energized to lower the support plate 55 downwardly. This causes lowering of the lead frame until it is deposited on the opposed and generally parallel steps or rails 4 defined on the opposed vertical faces of the guideways 50a and 50b. These latter rails 4' project horizontally in parallel relationship to the longitudinal or elongated direction of the lead frame and permit transfer or movement of the lead frame therealong in the longitudinal or elongated direction thereof. These rails 4' are extended and defined guideways designated 50' which project to the flux coating device H.

Figure 8:
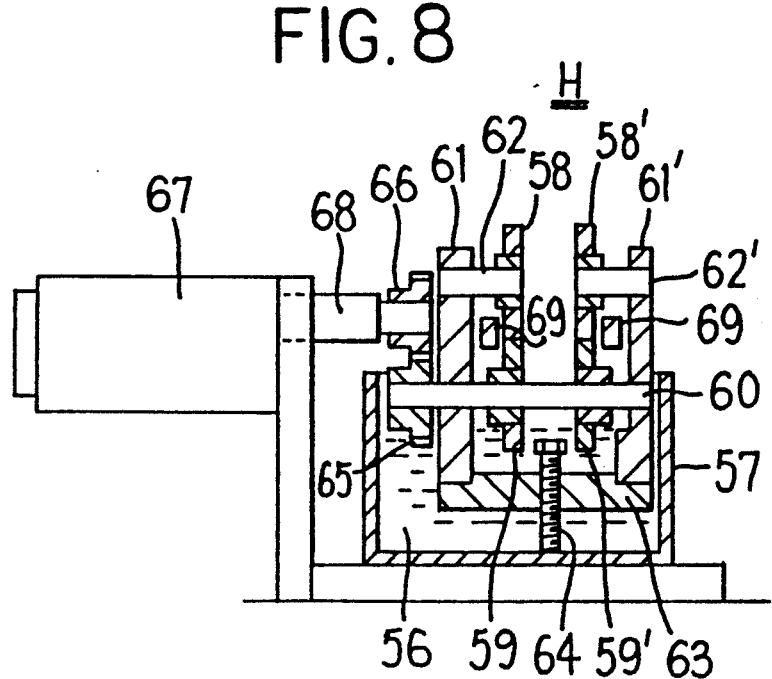
FIG. 8 is an elevational view, partially in section, of the flux coating device.

As illustrated by FIG. 8, the flux coating device H includes an upwardly opening tank or reservoir 57 containing therein a bath of flux solution 56. A pair of generally parallel and horizontally extending elongate guideways 69 extend across the open upper end of the flux bath, which guideways 69 effectively constitute extensions of the guideways 50' so as to slidably support opposite edges of the lead frame as it is moved in its longitudinal direction across the top of the flux bath 56.

Two pairs of vertically opposed roller brushes 58, 59 and 58', 59' are positioned between the guideways 69 so as to contact the upper and lower surfaces of the lateral lead sections 1c as the lead frame is moved longitudinally along the guideways 69. These rotatable roller brushes are supported on appropriate parallel shafts 60, 62 and 62' which in turn are supported on appropriate pillars 61 and 61' which project from a supporting base 63, the latter being vertically height adjustable within the bath by means of a threaded adjusting screw 64. Mating gears 65 and 66 are provided, the latter being provided on the shaft 68 of a drive motor 67 so as to effect rotation of the roller brushes. The lowermost roller brushes 59, 59' are disposed so that lower portions thereof dip into the flux bath. The upper shafts 61 and 61' permit the respective upper rollers to rotate freely. The lead frame, as it is advanced longitudinally to, across and away from the flux coating device H is pinched vertically between the opposed brush pairs 58, 59 and 58', 59' which, due to the rotation thereof and the dipping of the lower brushes into the flux solution bath, permit the opposite sides of the lateral lead sections 1c to be coated with the flux solution. Due to the open spaces between adjacent leads and between adjacent lead sections, the flux solution carried on the lower roller can be transferred to the engaged upper roller so as to permit proper contact and coating of the upper surfaces of the lead sections.

The lead frame is transferred longitudinally by the transfer device J along the guideways 50' to and partially through the flux coating device H for supplying the lead frame to the locating device I. This lead frame transfer device J is substantially identical to and functions in the same manner as the transfer device E described above, so that further description of the device J is believed unnecessary.

Figure 9:
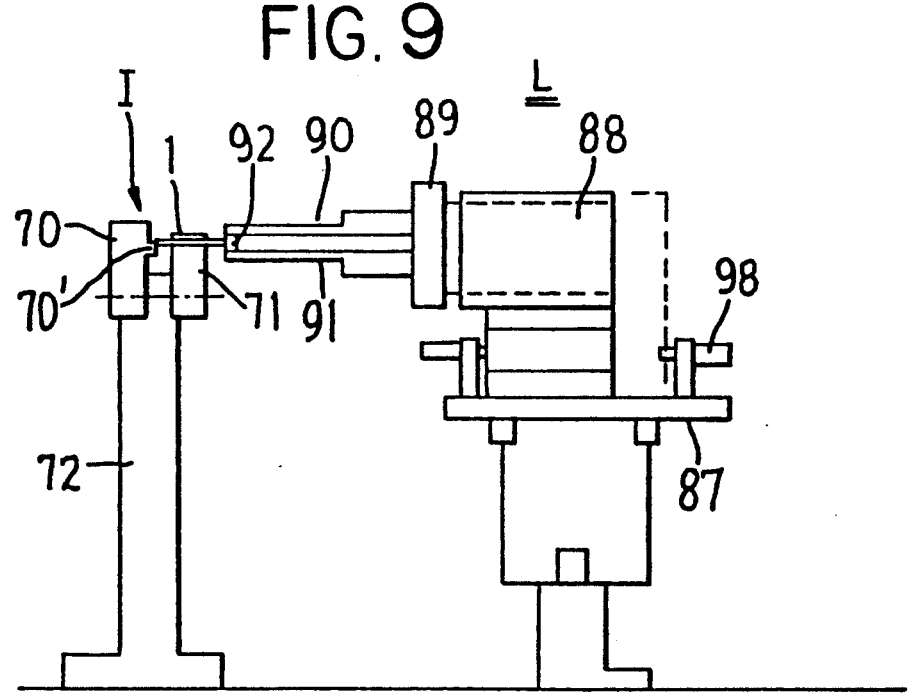
FIG. 9 is a side view of the locating device and of the clamping-type lead frame transfer device.

The lead frame locating device I includes a horizontally elongate guideway 70 which constitutes an extension of one of the guideways 69 and, as illustrated by FIG. 9, includes a step or rail 70' for supporting one longitudinally edge of the lead frame, this step being bounded by an upwardly projecting surface adapted to abut the longitudinal edge of the lead frame. A horizontally elongate support 71 is disposed in parallel relationship with and sidewardly spaced from the guideway 70, which support 71 has a generally flat upper surface which is adapted to supportingly engage the bottom surfaces on the plastic packages carried by the lead frame. The guideway 70 and support 71 are fixedly secured on a suitable stationary frame or pillar 72 and support the lead frame in such a manner that the one longitudinally extending edge thereof is cantilevered sidewardly so as to be engagable by the transfer device L as explained below.

Figure 10:
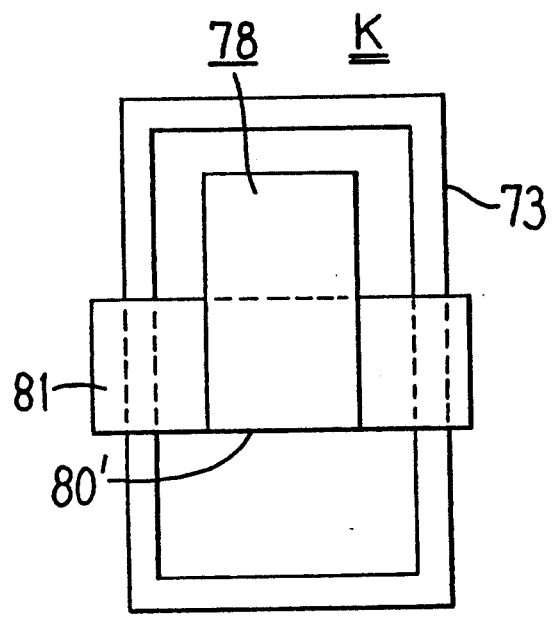
FIG. 10 shows the longitudinal solder coating device.
Figure 11:
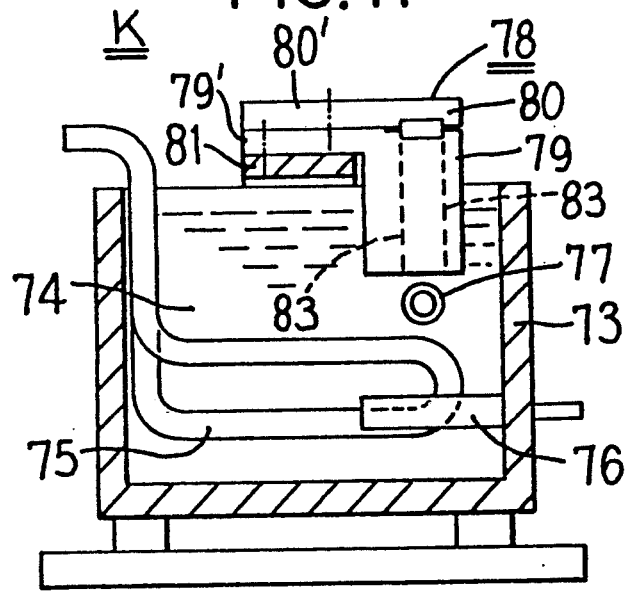
FIG. 11 is a vertical sectional view of the longitudinal solder coating device of FIG. 10.

Considering now the longitudinal solder coating device K, it is positioned adjacent the opposite end of the locating device I from the flux coating device H and, as shown in FIGS. 10 and 11, includes an upwardly opening tank 73 which defines therein a bath 74 of liquid solder material. A heat tube 75 extends through the bath, and a heat sensor such as a thermostat projects into the bath. An inert gas deliver tube 77 also projects into the bath for delivering an inert gas thereto.

A solder coating unit 78 is associated with the upper end of the bath and includes a lower coating block 79 and an upper coating guide or block 80. The lower coating block 79 is disposed so that a lower portion thereof projects downwardly into the solder bath 74, whereas the upper portion of lower block 79 is disposed upwardly above the bath. These blocks have platelike sideward extensions 79' and 80' which are fixedly secured together and are fixed to a support bar 81 which extends across the tank and is supported on the upper edges of opposed sidewalls thereof.

Figure 12:
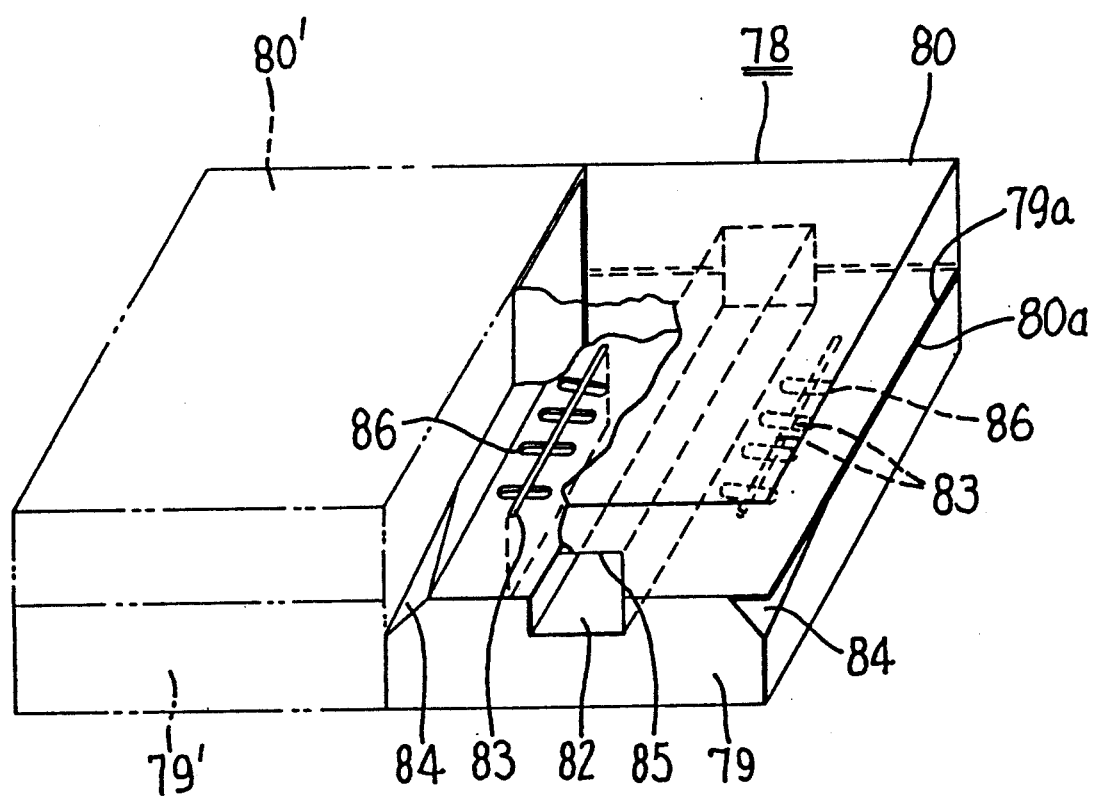
FIG. 12 is a perspective view, partially broken away, of the longitudinal coating block body.

The opposed surfaces of the lower and upper blocks 79 and 80 define a passage therebetween which in vertical transverse cross section substantially corresponds in configuration and size to the transverse cross section of the lead frame. As shown in FIG. 12, the upper surface 79a of block 79, and the opposed lower surface 80a of block 80, are slightly vertically spaced to define a passage therebetween which is sized to snugly but slidably accommodate the thickness of the metal defining the lead frame edge strips and lateral contact sections. A channel-like groove 82 projects downwardly from surface 79a and extends across this surface substantially centrally thereof, and a similar such channel-like groove 85 opens upwardly from the upper surface 80a and extends thereacross so as to substantially vertically align with the lower groove 82. These opposed grooves 82 and 85 are provided so as to closely but slidably accommodate the respective lower and upper halves of the plastic packages as the lead frame is moved in its longitudinal direction through the passage defined between the coating blocks 79 and 80. The groove 82 is dimensioned so that its width is equal to or only slightly bigger than the width of the package so as to effectively restrict flow of solder material into the groove, whereas the depth of this groove 82 is preferably deeper than the depth of the lower half of the plastic package so as to provide a clearance between the bottom of the groove and the bottom surface of the package, which clearance is preferably at least about 0.5 mm. Hence, even if liquid solder does flow down into the package groove 82, this clearance will prevent the solder from adhering from the plastic package. The dimensions of the upper groove 85 relative to the package size are similar to those described relative to groove 82. Similarly, the spacing between opposed surfaces 79a and 80a is selected so as to provide a small clearance between the surface 80a and the upper surface of the lead sections, and to also provide a small clearance between the surface 79a and the lower surface of the lead sections. Each of these latter clearances is preferably in the range of from about 0.1 to 0.5 mm, and is preferably about 0.3 mm. By maintaining such clearances, the lead frame passage as defined between the blocks 79 and 80 can store sufficient quantity of liquid solder to effectively coat both the upper and lower surfaces of the lateral lead sections as the lead frame moves through the passage.

The liquid solder is supplied to the lead frame passage by a pair of solder-supply slits 83 positioned on opposite sides of the groove 82. Each slit 83 has its upper end opening upwardly through the surface 79a for direct communication with the lead frame passage, and its lower end opens outwardly through the bottom of the block 79 for direct communication with the solder bath 74. The slit has a depth or length dimension which is of substantial magnitude and extends generally parallel with the slot 82 and hence parallel with the longitudinal or elongated direction of the lead frame. The width of the slit 83, however, which width is measured perpendicular to the lead frame longitudinal direction, is very narrow and preferably in the range of about 0.1 to about 0.5 mm so as to permit liquid solder to ascend upwardly through the slit due to capillary action, which ascending solder is accompanied by inert gas bubbles from the solder bath. The pair of capillary slits 83 are sidewardly spaced so that one slit will pass directly under the lateral lead sections 1c disposed on one side of the lead frame, and the other slit 83 will pass directly under the lateral lead sections 1c provided on the other side of the lead frame. A number of small but shallow grooves 86 intersect the upper end of the slit 83 at longitudinally spaced intervals therealong. The grooves 86 are formed in the upper surface 79a, and project laterally on opposite sides of the slit 83 so as to provide a wider pool of liquid solder at the surface 79a so as to permit more effective coating of the entire lead section 1c.

As illustrated by FIG. 12, the ends of the lead frame passage as provided at the delivery side of the lead frame are enlarged by cutting off the corners of the lower block 79 along inclined planes as indicated at 84. These inclined planes 84 enlarge the passage between the blocks at these areas, and permit surplus liquid solder within the passage to move out of the passage and downwardly along the inclined surfaces 84 for deposit back into the bath. This ability to remove the surplus solder minimizes the tendency for the solder to create bridges or whiskers on the leads.

To move the lead frame longitudinally into the through the longitudinal solder coating device K, the lead frame is engaged by the transfer device L when positioned on the locating device I, which transfer device L then moves the lead frame longitudinally into and through the solder coating device K and then deposits the coated lead frame on a terminal or discharge station M.

Figure 9A:
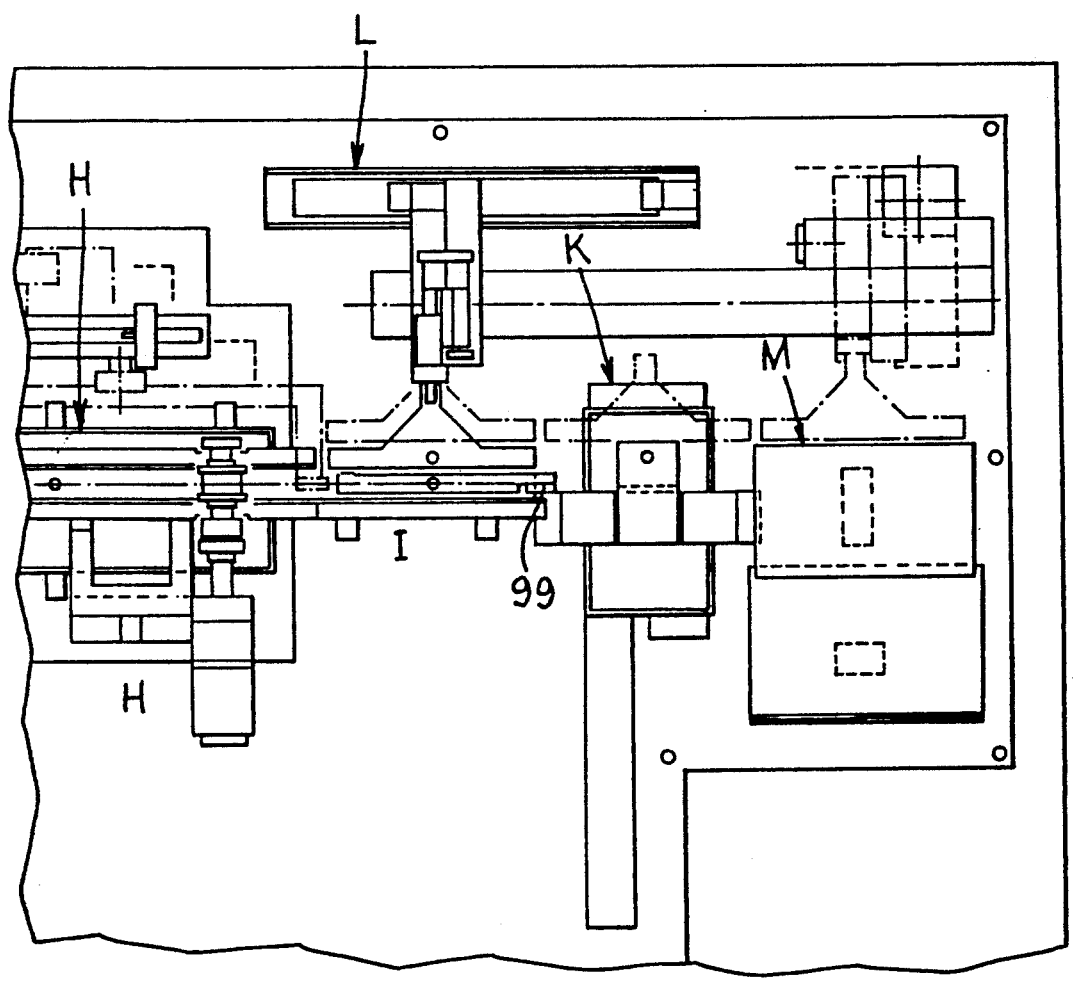
FIG. 9A is a diagrammatic plan view of the locating device and transfer device of FIG. 9.

This transfer device L, as illustrated by FIGS. 9 and 9A, is movable from a rearward position indicated by solid lines in FIG. 9A for clampingly engaging the lead frame supported on the locating device I, and then moving the lead frame longitudinally forwardly through the longitudinal solder coating device K and then depositing it on the discharge station, the latter being indicated by the dotted line position of FIG. 9A. At the pick-up location, the lead frame as positioned on the locating device I has its forward or lead end abutted against an adjustable stop 99 which determines proper location of the lead frame. The transfer device L includes a pair of pinch plates 90 and 91 which are mounted on and project outwardly from a holding member 89, the latter being movable outwardly and inwardly by a pressure cylinder 80 in a direction which is horizontally perpendicular to the lengthwise direction of the lead frame supported on device L. The free ends of the pinching or clamping members 90, 91 have clamping elements such as pins 92 on the free ends thereof, which clamping elements clampingly engage the lead frame along one longitudinally extending edge thereof, such as by inserting pins through openings formed in the edge strip of the lead frame. When the lead frame is clampingly engage by the clamp plates 90, 91, cylinder 88 is energized to retract the clamp plates 90, 91 and move the lead frame sidewardly (rightwardly in FIG. 9) away from the support rail 70' by a distance which approximately corresponds to the width of the lead frame. This results in the lead frame being laterally displaced from its prior position when supported on the locating device L. This results in the clamping device being positioned against the stop 98, the clamping device being positioned substantially as indicated by dotted lines in FIG. 9.

The entire clamping device is mounted on a slide plate 87 which is slidably supported on guide rails which extend parallel with the longitudinal direction of the lead frame, and the slide plate 87 is coupled to a suitable linear drive device such as a pressure cylinder or a rodless type cylinder. With this drive device energized, slide plate 87 then is linearly displaced to effect linear movement of the lead frame substantially in the longitudinal direction thereof. Since the lead frame is clamped in a cantilevered manner along one longitudinally extending edge thereof, this permits the lead frame to move into the passage defined between the coating blocks 79 and 80 so as to coat opposite surfaces of the lateral lead sections 1c, which forward movement continues until the lead frame totally passes through the longitudinal solder coating device. The transfer mechanism L then releases the lead frame and deposits it at the terminal station M, and thereafter returns to its opposite end location adjacent the locating device L so as to clampingly engage and transfer the next lead frame.

OPERATION

The operation of the apparatus will now be briefly described.

The lead frame 1 is transferred from cassette A to the guideways 2. The fork-type lead frame holder 12 holds the lead frame between its two holding stocks 13. Said holder moves horizontally and transfers the lead frame onto the next pair of guideways 2'. By this movement of the lead frame holder 12, the preceding lead frame which was already coated with flux is pushed to the guideways 21 of the locating and transfer device D by push rod 13'. After the new lead frame is transferred to the guideways 2', the holder returns to its initial position.

In the flux coating device C, the guideways 2' are moved vertically by the air cylinder 10 and descends into the flux bath 6. The lead frame on the guideways 2' is immersed in the flux solution. Its metal section is cleaned from oxides on its surface, and also activated. After that the guideways 2' ascend with the lead frame on it.

In the locating and transfer device D, the lead frame 1 on the supporting steps 4 is pushed up until it meets with the upper guideway 29 by the ascending movement of the push plate 28 driven by the locating cylinder and piston 26 and 27. The longitudinal sectional profile of the lead frame mates with the profile of the upper guide plate 29.

After locating the lead frame next to the upper guide plate 29, the cross push rods 30 push, by advancement of the driving head 34, the lateral side of the lead frame. The lead frame moves across the plate 21b, and passes across block body 41 of the lateral solder coating device F. At the time when the lead frame passes the block body 41, the lead frame is coated on both sides of the metal lead section with liquid solder material which ascends through the capillary slits 46 of the block body 42 and stays in the lead frame passage. Liquid solder material consumed by coating is replenished by entrainment of liquid solder material accompanied by movement of the lead frame.

The lead frame moves with push rods 30 until abutting the side wall of the guideway 50b. At this time, support plate 55 is at its top position, and accepts the lead frame. Next, the support plate 55 descends, and the lead frame is transferred onto the steps 4 of the guideways 50. Rods 30 returns to their initial position.

Next, lead frame 1 is held by the fork-type lead frame holder 12' between its two holding sticks 13', and is moved to the flux coating device H. (Lead frame holder J is the same as that used in before-mentioned lead frame transfer device E.) In this case, an already processed lead fame is pushed out by the push rod 13'a to the location where the lead end of the lead frame is engaged between the two pairs of brush wheels. Lead frame holder 12' then returns to its initial position.

The two pairs of brush rollers 58 and 59, 58' and 59' are driven by the motor 67, and feed the lead frame forwardly between upper roller and lower rollers. As lower rollers are immersed in flux solution at their lower parts, the lead frame is coated with flux, while the four brush wheels are turning and feed the lead frame forwardly. The lead frame is transferred onto the step 4 of the guideway 70 and the package support 71 for contact with the locating stop 99.

Next, the lead frame is cramped on its one lateral side by the cramping plates 90 and 91 of the lead frame transfer device L. The clamping plates 90 and 91 and the lead frame holding member 89, while cramping the lead frame, moves horizontally sidewardly a small extent, and then moves horizontally forwardly in the longitudinal direction of the lead frame so that the lead frame passes through the passage of the longitudinal solder coating device K, which comprises the coating block 79 and the coating guide 80. While passing through said passage, both surfaces of the lead section of the lead frame are coated with liquid solder material which ascended through capillary slits 83. The lead frame is then sent to the terminal station M.

By this coating method, metal surfaces are coated by liquid solder material immediately after oxide on said metal surface is removed by the flux solution. Said liquid solder material is supplied through slits by capillary phenomenon. Consequently, reliable solder film can be secured.

In this coating method, no mechanical moving element is used other than mechanical transfer devices which moves the lead frame through passages in the coating block bodies. Mechanical failures are thus greatly minimized.

Consumption of solder material can be minimized by adjusting the clearance between the passage and the lead frame, considering viscosity of liquid solder material.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A continuous solder coating apparatus for an elongated lead frame having a plurality of semiconductor devices mounted at spaced intervals therealong with each semiconductor device having leads projecting outwardly from at least one pair of opposite sides, comprising:

a solder coating unit including means defining a liquid solder bath, and a coating member positioned over said bath so that a lower portion of said member is immersed in said bath and an upper portion of said member is disposed above said bath;

said upper portion having a tunnel-like solder coating passage extending horizontally therethrough and defined between generally opposed top and bottom walls, said passage having a cross section which substantially corresponds to the cross section of the lead frame and includes a channel-like groove of enlarged cross section for accommodating a plastic package which encloses the semiconductor device and a pair of narrow slit-like passages which project horizontally outwardly from opposite sides of said groove for accommodating leads which project from opposite sides of the package;

said coating member including a plurality of slit-like slots of narrow width projecting vertically thereof, each of said slots having a lower end which opens through the lower portion of the coating member for direct communication with the solder bath, and each of said slots having an upper end which opens upwardly in direct communication with one of the slit-like passages, each slit-like passage having at least one of said slit-like slots communicating therewith for feeding solder upwardly to the slit-like passage by capillary action;

a flux coating device for applying a flux solution to opposite surfaces of the lead frame;

transfer means for supporting the lead frame in a horizontal orientation and for moving it from the flux coating device to the solder coating unit and for effecting horizontal movement of the horizontally-oriented lead frame into and through the coating passage to effect solder coating of upper and lower surfaces of the leads.

2. An apparatus according to claim 1, wherein the coating passage is transversely elongated and includes a plurality of said channel-like grooves extending longitudinally of the passage in generally parallel but horizontally sidewardly-spaced relationship, said coating member having a pair of sidewardly-spaced slit-like slots opening upwardly for communication at two sidewardly-spaced locations cf the slit-like passage between each adjacent pair of said channel-like grooves, said coating passage permitting the horizontally oriented lead frame to be moved horizontally therethrough in a direction perpendicular to the elongated direction thereof.

3. An apparatus according to claim 2, including a surplus solder collecting groove projecting lengthwise of said coating passage, said collecting groove communicating with the slit-like passage at a location disposed between the two slit-like slots which communicate with the slit-like passage between each adjacent pair of channel-like grooves.

4. An apparatus according to claim 1, wherein the coating passage has only a single said channel-like groove and is sized so as to permit movement of the horizontally-oriented lead frame horizontally through the coating passage in the longitudinal direction of the lead frame, each slit-like slot at its upper end communicating with the slit-like passage through an upper end opening which is elongated in parallel relationship to the channel-like groove, and a plurality of shallow solder distributing slots extending transversely across the upper end opening in spaced relationship therealong for distributing the solder transversely of the slit-like passage for coating of the leads as they move through the slit-like passage.

5. An apparatus according to claim 1, wherein said bath has means for discharging a stream of an inert gas therein to create bubbles within the bath which assists in moving the solder upwardly through the slit-like slots.

6. An apparatus for solder coating a lead frame having a plurality of semiconductor devices mounted thereon at spaced intervals therealong and each having a plastic package which projects vertically from the lead frame and a plurality of leads which project horizontally outwardly from the package with said leads including laterally directed leads which project outwardly from one pair of opposite sides of the package and longitudinally directed leads which project outwardly from another pair of opposite sides of the package, said apparatus comprising:

a first flux coating device for applying a flux solution to opposite surfaces of the leads which project outwardly from a first pair of opposite sides of the package;

a first solder coating device for simultaneously solder coating upper and lower surfaces of the leads which project outwardly in opposite directions from the first pair of opposite sides of the package;

a second flux coating device for applying a flux solution to upper and lower surfaces of the leads which project outwardly from a second pair of opposite sides of the package;

a second solder coating device for effecting simultaneous solder coating of the upper and lower surfaces of both of the leads which project outwardly from said second pair of opposite sides;

each of said solder coating devices including a bath containing liquid solder, and a solder coating block having an upper portion disposed above said bath and a lower portion projecting downwardly into the bath, the upper portion having a tunnel-like coating passage extending horizontally therethrough and defined between opposed top and bottom walls for permitting horizontal movement of the lead frame therethrough, said coating passage including an enlarged channel-like groove extending longitudinally thereof for accommodating the package on the lead frame and a pair of vertically narrow slit-like passages disposed on horizontally opposite sides of and projecting sidewardly from the channel-like groove for receiving therein the leads which project outwardly from opposite sides of the package, and a pair of generally vertically-extending slit-like slot means formed in said coating block for feeding solder upwardly by capillary action from said bath to said slit-like passages, said slit-like slot means at upper ends communicating with said slit-like passages and at lower ends communicating directly with said bath;

said coating passage as associated with the coating block of one said coating device being transversely horizontally elongated and having a plurality of sidewardly-spaced said channel-like grooves extending therealong in correspondence with the number of packages provided on the lead frame for permitting the lead frame to be moved horizontally through the coating passage in a lateral or sideward direction of the lead frame; and said coating passage associated with the coating block of the other coating device having only a single said channel-like groove associated therewith for permitting horizontal movement of the lead frame through the coating passage in the longitudinal direction of the lead frame.

7. An apparatus according to claim 6, including means for supporting and effecting transfer of the lead frame from the first flux coating device to and through the first solder coating device, followed by transfer of the lead frame to the second flux coating device, and then followed by movement of the lead frame to and through the second solder coating device.

8. An apparatus according to claim 7, wherein said first flux coating device includes means defining a flux solution bath, and a lead frame handling device for effect immersion of the lead frame into the flux solution bath for removing oxides and activating the surfaces of the leads.

9. An apparatus according to claim 8, wherein the second flux coating device includes means defining a flux solution bath, sidewardly-spaced pairs of coating rollers positioned for simultaneously engaging the lateral leads disposed on opposite sides of the package for coating upper and lower surfaces of the leads, each pair of rollers including upper and lower rollers, and the lower rollers being positioned so that lower portions thereof dip into the flux solution bath.

10. An apparatus according to claim 6, wherein the channel-like groove has a depth so that a bottom surface of the groove is spaced downwardly from a bottom surface of the package so as to provide a vertical clearance therebetween of at least about 0.5 mm.

11. An apparatus according to claim 6, wherein the slit-like passage is of narrow vertical width as defined between opposed upper and lower surfaces so as to define vertical clearances of about 0.1 mm to about 0.5 mm between the upper and lower surfaces of the leads and the respectively opposed upper and lower surfaces of the slit-like passage.

12. An apparatus according to claim 6, wherein the slit-like slot means has a width of between about 0.1 mm and about 0.5 mm.

13. An apparatus according to claim 6, wherein each of the solder baths has an inert gas discharge pipe communicating therewith for preventing oxidation of the solder and for assisting the capillary ascent of solder upwardly through the slit-like slot means.

14. An apparatus according to claim 6, wherein the coating passage which permits lateral movement of the lead frame therethrough is provided with a surplus solder collecting groove opening downwardly from each slit-like passage at a location between each adjacent sidewardly-spaced pair of channel-like grooves.

15. A solder coating process comprising the steps of:
providing an elongate lead frame formed generally as a thin metal strip having a plurality of semiconductor devices mounted thereon at longitudinally spaced intervals, each semiconductor device being enclosed in an enlarged plastic package which projects outwardly from opposite sides of the strip, the lead frame including first and second pairs of metal leads associated with each said package, the first pair of metal leads projecting outwardly in opposite directions from a first pair of opposite sides of the package so that the leads of said first pair project in the longitudinal direction of the lead frame, and the second pair of metal leads projecting outwardly in opposite directions from a second pair of opposite sides of the package so that the leads of said second pair project sidewardly relative to the longitudinal direction of the lead frame;

providing a first solder coating device which includes a first solder coating block which projects downwardly for immersion into a solder bath and which has an upper portion disposed above the bath and has a first tunnel-like solder coating passage extending horizontally therethrough, the first solder coating passage having a transverse vertical cross section which substantially corresponds to the longitudinal cross section of the lead frame;

immersing said lead frame into a flux solution bath to remove oxide film from the lead frame and to activate the lead frame surfaces;

then horizontally orienting the lead frame and moving the lead frame horizontally in a sideward direction which is generally perpendicular to said elongated direction so as to move the lead frame into and through the first tunnel-like coating passage;

supplying solder material upwardly by capillary action from the solder bath through a plurality of sidewardly-spaced narrow slits to sidewardly-spaced portions of the first coating passage for simultaneously coating upper and lower sides of all longitudinally extending leads of said lead frame as the lead frame moves sidewardly through the first coating passage;

providing a second solder coating device having a solder bath and a second solder coating block having a lower portion immersed in the bath and an upper portion disposed above the bath and provided with a second tunnel-like coating passage extending horizontally therethrough, said second coating passage having a transverse vertical cross section which substantially corresponds to the sideward cross section of the lead frame as taken through one of said plastic packages;

applying a flux coating solution to the upper and lower surfaces of the sidewardly-projecting leads after the longitudinally-projecting leads have been solder coated;

then moving the horizontally-oriented lead frame horizontally in its elongated direction into and through the second coating passage; and solder coating the upper and lower surfaces of the sidewardly-extending leads disposed at opposite sides of the packages by feeding solder upwardly by capillary action from the bath through vertically upwardly extending narrow slits which communicate with vertically-narrow portions of said second solder coating passage at locations disposed adjacent opposite sides thereof.

16. A method according to claim 15, including supplying an inert gas into the solder bath for minimizing oxidation of the solder in the bath and for assisting in the upward flow of solder by capillary action through the narrow slits to the respective coating passage.

17. A method according to claim 16, wherein the flux solution is applied to opposite surfaces of the sidewardly-projecting leads by longitudinally and horizontally moving the lead frame between two sidewardly-spaced pairs of upper and lower flux-coating rollers.

* * * * *